(12) United States Patent
Butler et al.

(10) Patent No.: US 9,551,849 B2
(45) Date of Patent: *Jan. 24, 2017

(54) INTERPOSER STRUCTURE HAVING OPTICAL FIBER CONNECTION AND RELATED FIBER OPTIC CONNECTOR FOR THE SAME

(71) Applicant: Corning Optical Communications LLC, Hickory, NC (US)

(72) Inventors: Douglas Llewellyn Butler, Painted Post, NY (US); Micah Colen Isenhour, Lincolnton, NC (US); Dennis Michael Knecht, Hickory, NC (US); James Phillip Luther, Hickory, NC (US); James Scott Sutherland, Corning, NY (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/944,737

(22) Filed: Nov. 18, 2015

(65) Prior Publication Data

US 2016/0170163 A1    Jun. 16, 2016

Related U.S. Application Data

(62) Division of application No. 13/792,790, filed on Mar. 11, 2013, now Pat. No. 9,217,839.

(Continued)

(51) Int. Cl.
*G02B 6/36* (2006.01)
*G02B 6/42* (2006.01)
(Continued)

(52) U.S. Cl.
CPC .............. *G02B 6/4292* (2013.01); *G02B 6/30* (2013.01); *G02B 6/3882* (2013.01);
(Continued)

(58) Field of Classification Search
CPC ....... G02B 6/30; G02B 6/3882; G02B 6/3885; G02B 6/4267; G02B 6/4269; G02B 6/428; G02B 6/4292; G02B 6/4202
(Continued)

(56) References Cited

U.S. PATENT DOCUMENTS 4,478,485 A * 10/1984 Khoe .................. G02B 6/3823
385/53
5,596,662 A    1/1997 Boscher et al.
(Continued)

FOREIGN PATENT DOCUMENTS

EP    1031859       8/2000
EP    1031859 A1    8/2000
(Continued)

OTHER PUBLICATIONS

Patent Cooperation Treaty International Searching Authority, Form PCT/ISA/206, Application No. PCT/US2014/013480, May 13, 2014, 6 pages.
(Continued)

*Primary Examiner* — Akm Enayet Ullah
*Assistant Examiner* — Michael Mooney

(57) ABSTRACT

Disclosed are interposer structures having an optical fiber connection and a related fiber optic ferrule that can form a portion of an optical assembly. The interposer structure is useful for transmitting optical signals to/from an integrated circuit that may be attached to the interposer. Specifically, the interposer structure and the related ferrule of the optical connector provide a passively aligned structure having a matched thermal response to maintain a suitable optical (Continued)

connection between the devices over a range of temperatures.

13 Claims, 9 Drawing Sheets

Related U.S. Application Data

(60) Provisional application No. 61/760,920, filed on Feb. 5, 2013.

(51) Int. Cl.
*G02B 6/38* (2006.01)
*G02B 6/30* (2006.01)

(52) U.S. Cl.
CPC ......... *G02B 6/3885* (2013.01); *G02B 6/4202* (2013.01); *G02B 6/428* (2013.01); *G02B 6/4267* (2013.01); *G02B 6/4269* (2013.01); *Y10T 29/49826* (2015.01)

(58) Field of Classification Search
USPC ...................................................... 385/53–94
See application file for complete search history.

(56) References Cited

U.S. PATENT DOCUMENTS

| | | | |
|---|---|---|---|
| 5,625,730 | A | 4/1997 | Ishikawa et al. |
| 6,459,843 | B1 | 10/2002 | Igl et al. |
| 6,478,474 | B1 | 11/2002 | Sander et al. |
| 6,736,546 | B2 | 5/2004 | Kiani et al. |
| 6,736,646 | B2 | 5/2004 | Suzuki |
| 9,217,839 | B2* | 12/2015 | Butler .................. G02B 6/3882 |
| 2003/0091297 | A1* | 5/2003 | Hung .................. G02B 6/3839 385/83 |
| 2003/0201462 | A1 | 10/2003 | Pommer et al. |
| 2004/0151439 | A1 | 8/2004 | Ohtsuka et al. |
| 2010/0051416 | A1 | 3/2010 | De Jong |
| 2011/0229083 | A1 | 9/2011 | Dainese, Jr. et al. |
| 2012/0155803 | A1* | 6/2012 | Benjamin ............ G02B 6/3886 385/33 |
| 2012/0189254 | A1 | 7/2012 | Wang et al. |
| 2012/0201499 | A1 | 8/2012 | Buijs et al. |
| 2012/0219255 | A1 | 8/2012 | Bradley et al. |

FOREIGN PATENT DOCUMENTS

| | | |
|---|---|---|
| GB | 2098354 | 11/1982 |
| GB | 2098354 A | 11/1982 |
| JP | 7-318761 | 12/1995 |
| WO | WO 02/088810 A1 | 11/2002 |
| WO | WO02088810 | 11/2002 |

OTHER PUBLICATIONS

Patent Cooperation Treaty International Search Report, Application No. PCT/US2014/013480, Jul. 25, 2014, 6 pages.
Chinese Search Report issued in corresponding CN Appln. No. 201480011554X, dated Jun. 2, 2016.
Chinese First Office Action issued in corresponding CN Appln. No. 201480011554X, Jun. 20, 2016.
Communication Under Rules 161(1) and 162 Epc issued in corresponding EP Appln. No. 14706994.2 dated Sep. 17, 2015.
IPRP and Written Opinion issued in corresponding PCT Appln. No. PCT/US2014/013480, dated Aug. 11, 2015.
International Search Report issued in corresponding PCT Appln. No. PCT/US2014/013480, Jul. 25, 2014.
Form PCT/ISA1206, issued in corresponding PCT Appln. No. PCT/US2014/013480, dated May 13, 2014.
CN201480011554X Search Report Dated Jun. 2, 2016.

\* cited by examiner

000# INTERPOSER STRUCTURE HAVING OPTICAL FIBER CONNECTION AND RELATED FIBER OPTIC CONNECTOR FOR THE SAME

RELATED APPLICATIONS

This application is a divisional of U.S. patent application Ser. No. 13/792,790, filed on Mar. 11, 2013, which claims the benefit of priority under 35 U.S.C. §119 of U.S. Provisional Application Ser. No. 61/760,920 filed Feb. 5, 2013, the content of which is relied upon and incorporated herein by reference in its entirety.

FIELD

The disclosure relates generally to an interposer structure having an optical fiber connection for making an optical connection with an integrated circuit along with a related fiber optic connector for attaching to the interposer structure. Specifically, the interposer structure and the related connector provide a passively aligned structure having a matched thermal response to maintain proper optical alignment.

BACKGROUND

Optical fibers have displaced copper-based connectivity in much of the traditional long-haul and metro telecommunication networks for numerous reasons such as large bandwidth capacity, dielectric characteristics and the like. As higher network speeds for communication networks are required the optical fiber will move deeper into the communication networks toward the electronics located in servers and switches that manage traffic on the communication network. As this migration of optical fibers deeper into communication networks occur new challenges will be encountered for making optical connections to the electronics. By way of example, aligning and maintain optical alignment of a plurality of optical fibers of an optical connection during operating conditions presents unresolved needs.

SUMMARY

The disclosure is directed to a fiber optic connector ferrule having a body including a first alignment bore having a round shape, a second alignment bore being non-round, a first plurality of optical fiber openings being disposed on a first side of the alignment bore, and a second plurality of optical fiber openings being disposed on a second side of the first alignment bore. The ferrule may be a portion of an optical assembly. Further, the optical assembly may be attached to an interposer structure and allow for proper optical performance during temperature variations.

The disclosure is also directed to an interposer structure including a circuit board, and an interposer having a connector mounting surface and a first pin and a second pin attached to the connector mounting surface, wherein the interposer is attached to the circuit board. The interposer includes a plurality of optical pathways for alignment with an optical assembly for allowing transmission of optical signals by the interposer. The connector mounting surface may have a first pin alignment feature and a second pin alignment feature formed therein. Other embodiments having the connector mounting surface being recessed from a planar surface of the interposer. Further, the interposer is formed from any suitable material such as silicon.

Also disclosed are methods of making an interposer including forming an interposer form a silicon material so it has a connector mounting surface, and attaching a first pin and a second pin to the connector mounting surface. The method may include other steps as disclosed herein.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
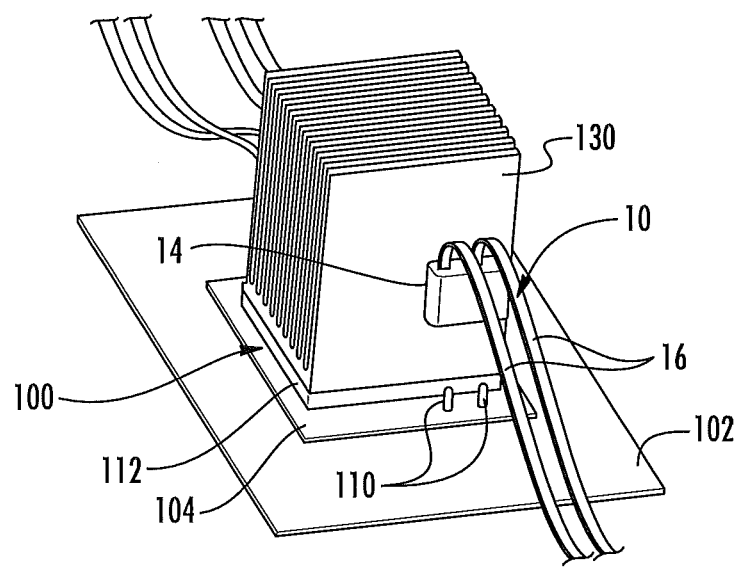
FIG. 1 is a perspective view of an interposer structure having an optical fiber interface for optical connection according to the concepts disclosed herein.

Reference is now made in detail to the present preferred embodiments of the disclosure, examples of which are illustrated in the accompanying drawings. Whenever possible, identical or similar reference numerals are used throughout the drawings to refer to identical or similar parts. It should be understood that the embodiments disclosed herein are merely examples with each one incorporating certain benefits of the present disclosure. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure in view of, but not limited to the embodiments described herein.

Disclosed are interposer structures having an optical fiber connection for making an optical connection with an integrated circuit (IC) along with a related fiber optic connector for attaching to the interposer structure. The interposer structure acts as a signal bridge between the IC connected electrically to a circuit board or the like while also being able to process high-speed optical signals received from the interposer structure via the optical connection. Specifically, the interposer structure and the related optical connector provide a passively aligned structure having a matched thermal response to maintain proper optical alignment between a plurality of the optical fibers and optical paths on the interposer. The interposer structures and optical fiber connections described herein are advantageous since they provide a robust high-density optical solution that addresses the challenges for providing optical connectivity to an IC via the interposer.

FIG. 1 is a perspective view of an interposer structure 100 having an optical fiber connection configured to attach to an optical assembly 10 according to the concepts disclosed herein. The interposer structure 100 allows an integrated silicon photonics solution for providing an optical connection to an integrated circuit (IC) or the like, thereby making an optical connection with the IC instead of solely having a conventional copper connection via an electrical connector. As shown, interposer structure includes a circuit board 102 and an interposer 104. The interposer 104 is attached to the circuit board 102 and may include communication links therebetween such as electrical connections. Interposer 104 includes a plurality of optical pathways (not visible) for transferring optical signals from optical assembly 10 to and integrated circuit 112 (i.e. chip) attached to the interposer, thereby providing optical communication. Interposer 104 also has alignment features that are configured as a first alignment pin 110 and a second alignment pin 110 for precisely aligning optical assembly 10 with the optical pathways of the interposer 104. The assembly shown also includes an exemplary heat sink 130 disposed on the integrated circuit 112 for cooling and providing a lower operating temperature for the IC, but other heat sinks, cooling fan, and/or other cooling arrangements are possible.

Figure 2:
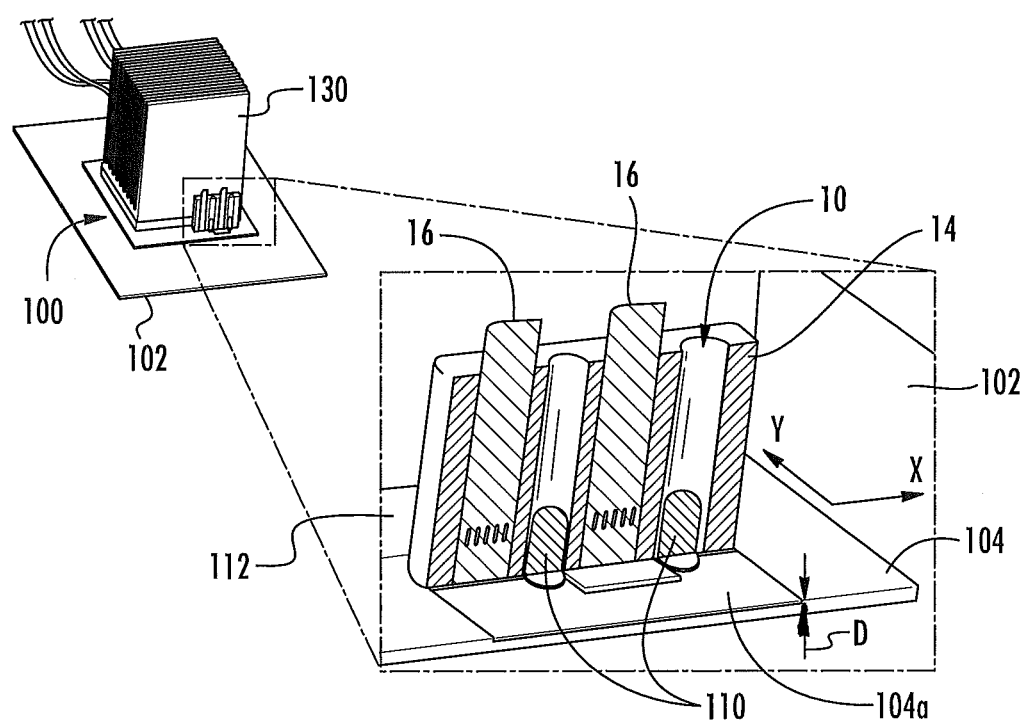
FIG. 2 is a perspective view of the interposer structure of FIG. 1 showing a detailed cross-section of the optical connection between the interposer and the optical assembly.

FIG. 2 is a perspective view of the interposer structure 100 showing a detailed cross-section of the optical connection between the interposer 104 and optical assembly 10 in a mated position. As shown, interposer 104 includes a connector mounting surface 104a where one end of the optical pathways (not visible) are exposed for optical connection with optical assembly 10. Optical assembly 10 includes a fiber optic connector ferrule 14 (hereinafter "ferrule") having a plurality of optical fibers 16 attached to the body of the ferrule as shown. The optical connection between the interposer 104 and the optical assembly 10 provides a relatively large number of optical connections in a relatively small area, thereby providing a large bandwidth connection without any of the concerns generally associated with electrical connections such as cross-talk, stray capacitance, etc. However, providing the precise alignment between the optical pathways of the interposer 104 and the optical fibers 16 of optical assembly 10 presents alignment challenges. For instance, the precise optical alignment needs to be maintained even with large temperature variations. Consequently, the coefficient of thermal (CTE) between the interposer material and ferrule material need to be matched to a given value (i.e., CTE delta between materials) for accommodating variations in temperature so that suitable optical connectivity is maintained. In one embodiment, the interposer 104 is formed from a silicon material such from a silicon wafer with the optical pathways formed in the silicon during that manufacturing process. Moreover, the CTE of the ferrule material should be within a given range (e.g., CTE delta) of the interposer CTE for maintaining optical performance during temperature variations. As shown in FIG. 2, the interposer 104 includes a first pin 110 and a second pin 110 that extend from the connector mounting surface 104a and engage alignment features of ferrule 14 for providing precise alignment for optical connectivity to the optical pathways of the interposer 104. Specifically, the optical assembly 10 includes optical fiber openings (e.g., bores) that are arranged in a precise pattern that may be symmetrical or asymmetrical as desired. As non-limiting examples, the patterns may be arranged as linear and/or circular arrays that correspond to the optical pathways of the interposer 104. Shorter suitable distances from the optical fibers openings to the centerline of the controlling alignment pin may result in better CTE performance.

In this embodiment, a portion of the connector mounting surface 104a is recessed from a planar surface (not numbered) of the of the interposer and is formed during the manufacturing process. The profile of the connector mounting surface 104a generally conforms with the end face profile of ferrule 14, thereby allowing a portion of the ferrule 14 to be seated into the interposer 104 and inhibit off-axis forces on the optical assembly 10 from being applied to the pins 110. By way of example, the connector mounting surface 104a may be recessed from a planar surface of interposer 104 by a depth D such as 25 microns or more. The ferrule 14 may be held in position on the interposer 104 using a frame (not shown) or other structure for securing the optical connection. In further embodiments, the connector mounting surface may include one or more pin alignment features for precisely locating alignment pins relative to optical pathways of the interposer. By way of example, the interposer formed from silicon may have a first pin alignment feature and a second alignment feature precision formed in the connector mounting surface such as first and second recesses for receiving a portion of the respective pins. For instance, the recessed pin alignment features may be sized to have an interference or friction fit for receiving the pins in the desired locations. In other embodiments, the pins may be precisely located and attached using a vision based alignment or the like for placement on the connector mounting surface. As shown, optical assembly 10 has a first group of optical fibers 16 and a second group of optical fibers 16 spaced apart on the ferrule 14 and pins 110 cooperate with ferrule as will be discussed in more detail below.

Figure 3:
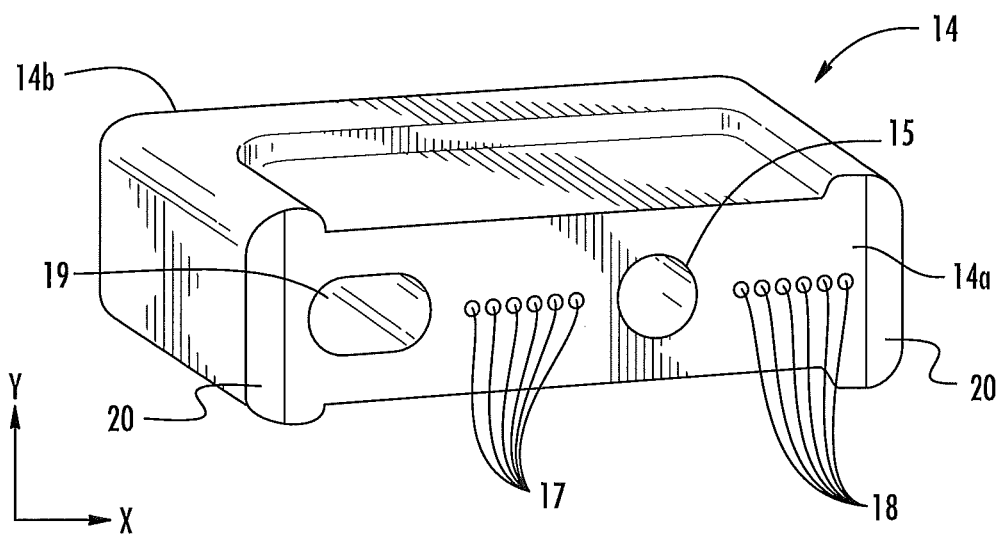
FIGS. 3 and 4 are respective front and rear perspective views of the ferrule of the optical assembly shown in FIGS. 1 and 2.
Figure 4:
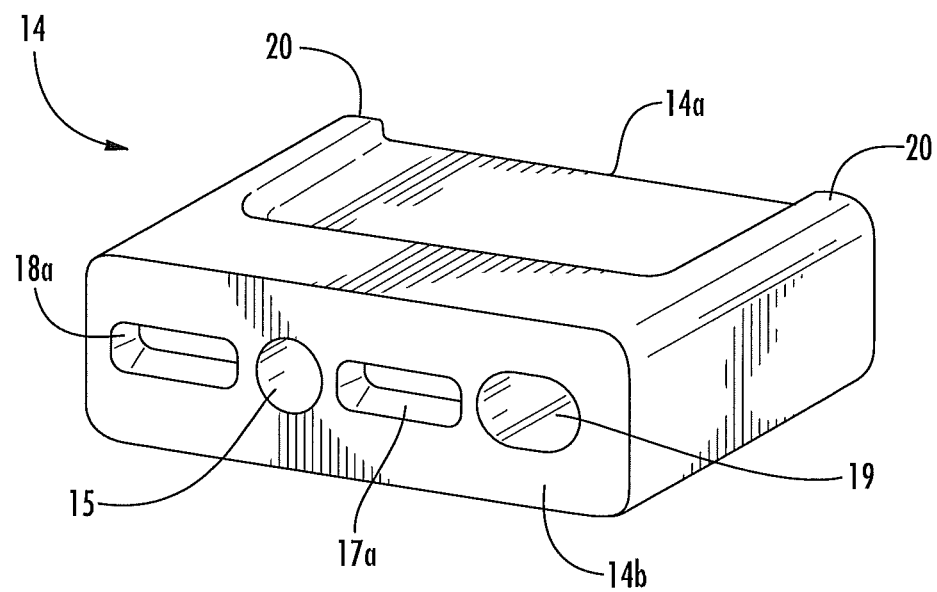
Figure 14:
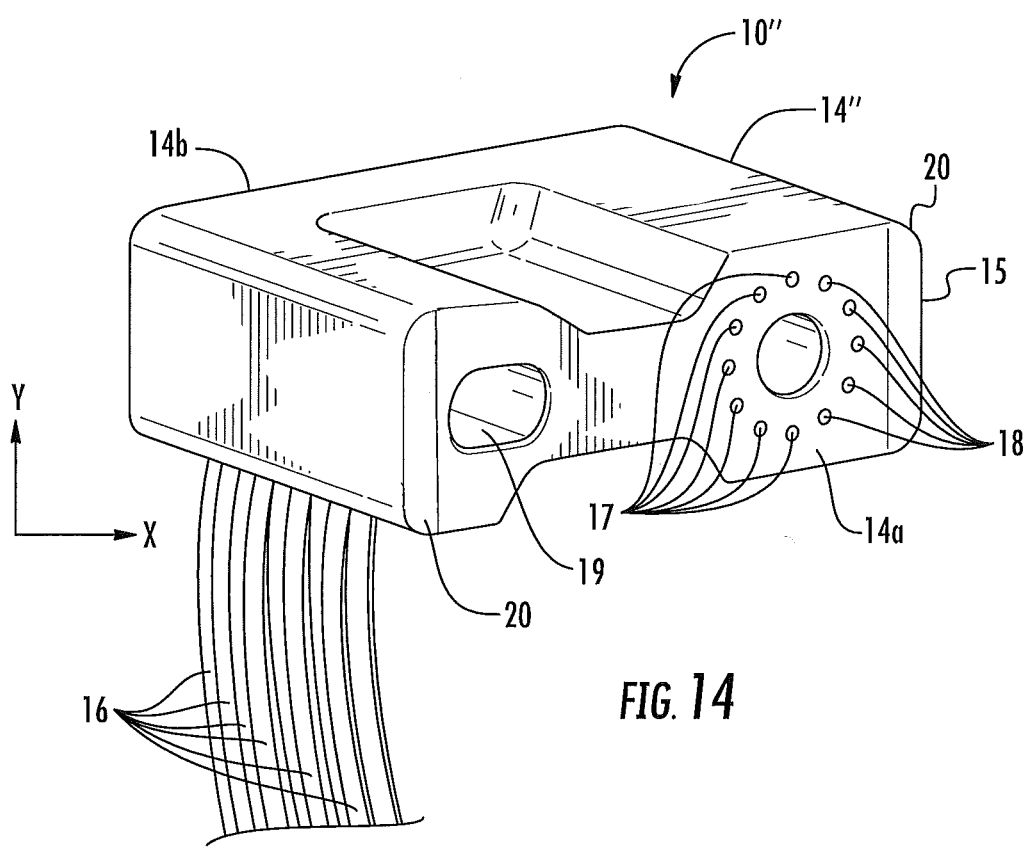
FIG. 14 is a close-up view of the end face of the ferrule of the optical assembly of FIGS. 11-13 showing the optical assembly having the optical fibers arranged in a circular array about the first alignment bore.

FIGS. 3 and 4 are respective front and rear perspective views of ferrule 14. Ferrule 14 includes a body having a front end 14a and a rear end 14b. In this embodiment, ferrule 14 includes a first plurality of optical fiber openings 17 and a second plurality of optical fiber openings 18 for receiving optical fibers along with a first alignment bore 15 and second alignment bore 19 for receiving pins 110 during mating of the optical assembly 10. As shown in FIG. 4, the first plurality of optical fiber openings 17 extend rearward to an opening 17a for inserting optical fibers into the ferrule 14. Likewise, the second plurality of optical fiber openings 18 extend rearward to an opening 17a for inserting optical fibers into the ferrule 14. Moreover, the first plurality of optical fiber openings 17 are disposed on a first side of first alignment bore 15 and the second plurality of optical fiber openings 18 are disposed on a second side of first alignment bore 15. The first plurality of fiber openings 17 and the second plurality of fiber openings 18 are aligned along a common axis (e.g., line or linear array) and disposed on opposite sides of the first alignment bore 15 as shown. Further, the first plurality of optical fiber openings 17 is disposed between the first alignment bore 15 and the second alignment bore 19. On the other hand, the second plurality of optical fiber openings 18 are disposed between the first alignment bore 15 and a periphery of the ferrule 14. Each plurality of optical fiber openings may have the same number or optical fibers openings such as six, eight, twelve, etc. or different numbers of optical fiber openings. Locating the optical fiber openings symmetrically about first alignment bore 15 generally provides an equal distance from this reference location, which may provide advantages for optical performance during thermal variations. Symmetric arrangements having a non-linear configurations for the fiber openings are also possible according to the concepts disclosed herein such as a circular array of fiber openings disposed about the first alignment bore as shown in FIG. 14. Additionally, the body of ferrule 14 includes one or more bumpers 20 for recessing a mating end face of the ferrule. In this embodiment, the bumpers 20 are located at opposite ends of front end 14a, but other embodiment may configure the bumper as a one-piece partial or full ring. The bumpers or the shape of the ferrule body may also be used for keying the optical assembly to the interposer.

With continued reference to FIGS. 3 and 4, the first alignment bore 15 has a round shape and the second alignment bore 19 has a non-round shape such as an oval shape. Using a non-round shape for the second alignment bore 19 of ferrule 14 along with round alignment pins on the interposer 104 may provide improved performance and/or eliminates stress/damage on the pins 110 of the interposer 104. Specifically, the first alignment pin 110 received in first alignment bore 15 having a round shape has a precision fit to the bore for providing alignment of the optical fibers 16 to the optical pathways in the X- and Y-directions. Whereas, the second alignment bore 19 is elongated along the X-direction to only provide alignment with pin 110 in the Y-direction (i.e., along the common axis of the optical fiber openings), thereby providing rotational alignment of along the common axis and inhibiting stresses on the pins/ferrule/interposer due temperature variations. Stated another way, significant changes in temperature will not cause large stresses if the CTE of between of the interposer material and ferrule material are not exactly the same (i.e., there is a CTE delta between materials.) because the ferrule 14 is only fixed at one location and can expand or contract in either direction from the first alignment bore 15.

Preferably, ferrule 14 is formed from a material that has a CTE that is matched to the CTE for the interposer material, but in practice the materials will be different and there will be a CTE delta. However, the ferrule material should be selected to provide the desired performance and material characteristics along with an acceptable CTE delta between the ferrule material and interposer material. By way of example, an acceptable CTE delta between the ferrule material and the interposer material is about $1.0 \times 10^{-6\circ}$ C. ($\Delta$mm/mm) at ambient conditions. A typical silicon material is isotropic and has a CTE value of $2.6 \times 10^{-6\circ}$ C. ($\Delta$mm/mm) at ambient conditions. Thus, for the example given the CTE of the ferrule materials is $2.6 \times 10^{-6\circ}$ C.$\pm 1.0 \times 10^{-6\circ}$ C. at ambient conditions An example of a suitable ferrule material is a polymer that includes a filler to help maintain the desired CTE delta with the interposer material. By way of example, the filler of the polymer material has a relatively high percentage. For instance, of 40 percent or more by weight, or 70 percent or more by weight. An example of a suitable polymer having a glass filler of 70 percent or more by weight. Other materials besides glass are possible for the filler material(s) such as ceramics like aluminosilicate glass-ceramic, borosilicate glass, quartz, and the like. Of course, non-filled materials may be used for ferrule 14 if they have suitable characteristics and properties. As a non-limiting example of a low CTE non-polymer material that may be used for the ferrule is a nickel iron alloy available under the tradename INVAR (e.g., 64FeNi).

Figure 5:
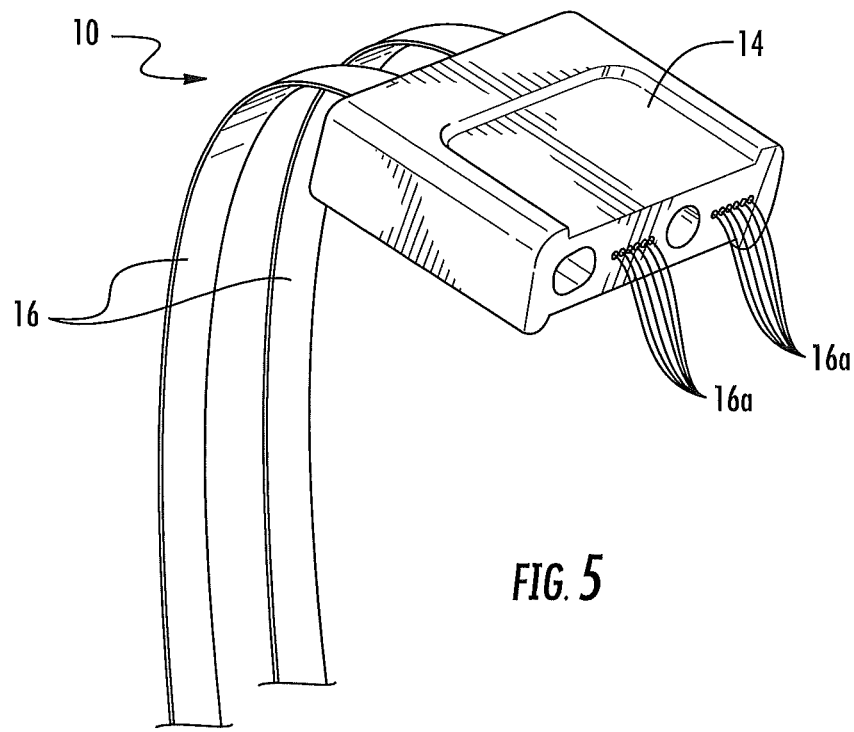
FIGS. 5 and 6 are various perspective views showing the optical assembly shown in FIGS. 1 and 2.
Figure 6:
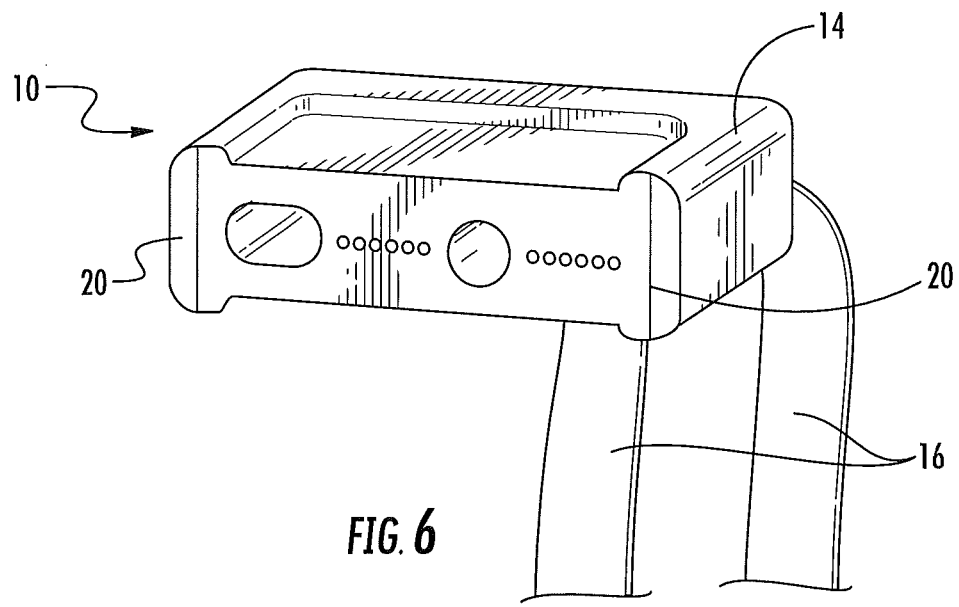

FIGS. 5 and 6 are various perspective views showing optical assembly 10. The mating end face of ferrule 14 and the optical fibers may be finished using any suitable method such as a laser processing and/or a mechanical polish. Other variations of the ferrule for the optical assembly are also possible according to the concepts disclosed herein such as varying the shape of ferrule body such as square or other shapes, different arrangement for the alignment structure.

Also disclosed are methods of making an interposer including forming an interposer from a silicon material so it has a connector mounting surface and attaching a first pin and a second pin to the connector mounting surface. In one embodiment, the connector mounting surface is formed so it is recessed from a planar surface of the interposer. For example, the interposer may be etched as known in the art so that the connector mounting surface has a recessed surface with precision geometry that generally conforms to the end face of a complimentary connector ferrule. Moreover, a plurality of optical pathways may also be formed into interposer for directing optical signals from/to the integrated circuit and to/from the optical fibers of the optical assembly. Still further, the connector mounting structure may also include alignment features for aligning and attaching the connector ferrule of the optical assembly. By way of example, the method may include attaching the first pin to a first pin alignment feature disposed at the connector mounting surface and attaching the second pin to a second pin alignment feature disposed at the connector mounting surface. As one example, the pin alignment features may be precision etched into the connector mounting surface or formed in other manners to provide micron or sub-micron alignment of the pins to the optical pathways on the interposer. Thus, an optical assembly such as described herein may be attached to the connector mounting surface of the interposer for creating an optical connection.

Figure 7:
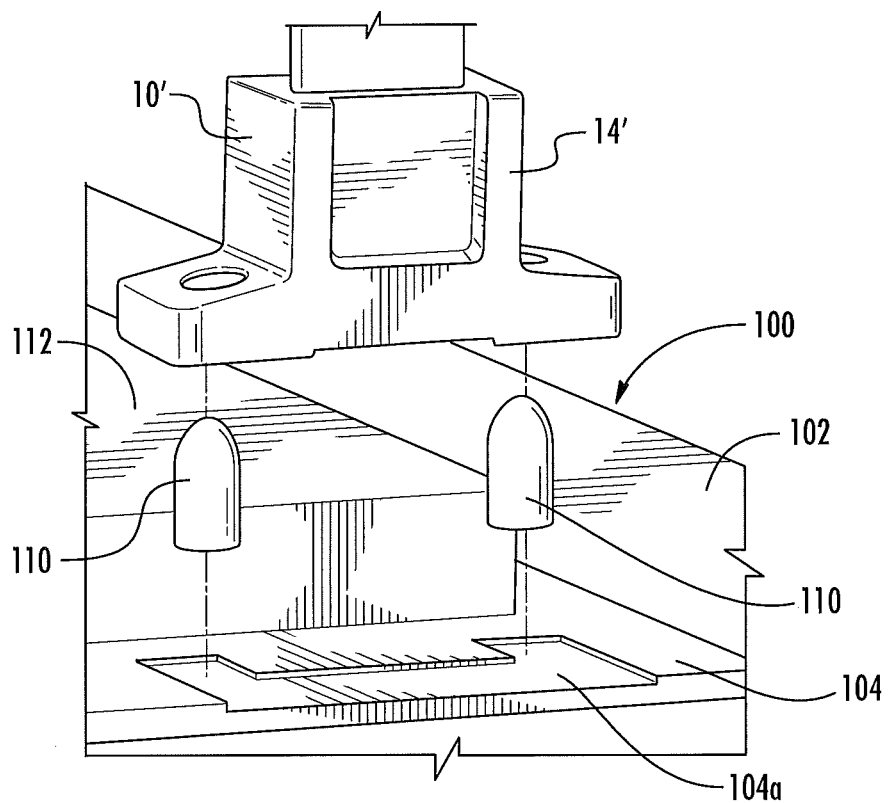
FIGS. 7-10 are views showing various steps for making an explanatory interposer structure according to the concepts disclosed herein.

Illustratively, FIGS. 7-10 depict various views showing explanatory steps for making an interposer structure according to the concepts disclosed herein. FIG. 7 is a partially exploded close-up view of interposer structure 100 along with an optical assembly 10'. Optical assembly 10' is similar to optical assembly 10, but uses a ferrule 14' that only includes a first plurality of optical fiber openings having optical fibers disposed between the first and second alignment bores unlike optical assembly 10. As shown, first pin 110 and second pin 110 are shown before being attached to interposer 104 and after integrated chip 112 is aligned and attached to the interposer 104. Pins 110 have a suitable size, shape and spacing on the interposer 104 to cooperate with the first and second alignment bores on the connector ferrule and properly align the optical fibers of optical assembly 10' with the optical pathways of interposer 104. By way of example, the pins may have a round shape with a diameter of 700 microns, but other suitable sizes and/or non-round shapes are possible for the pins.

Interposer 104 includes a portion of the connector mounting surface 104a that is recessed from a planar surface of the interposer 104. In this embodiment, the interposer 104 is formed from silicon material and the recessed connector mounting surface 104a is precision formed using a resist layer during a vapor deposition process to conform with the end face of the connector ferrule of optical assembly 10'. The recessed connector mounting surface 104a has a suitable depth such as 25 microns or greater, but other suitable depths are possible. Additionally, like optical assembly 10, the connector ferrule of optical assembly 10' is formed by a materials that has a CTE that is generally matched to the CTE of the silicon interposer 104. By way of example, the CTE of the connector ferrule and the CTE interposer are matched with a delta between CTE of the ferrule material CTE is within 40% percent of the interposer CTE, but other values for CTE matching are possible and may be influenced by design specifics.

Figure 8:
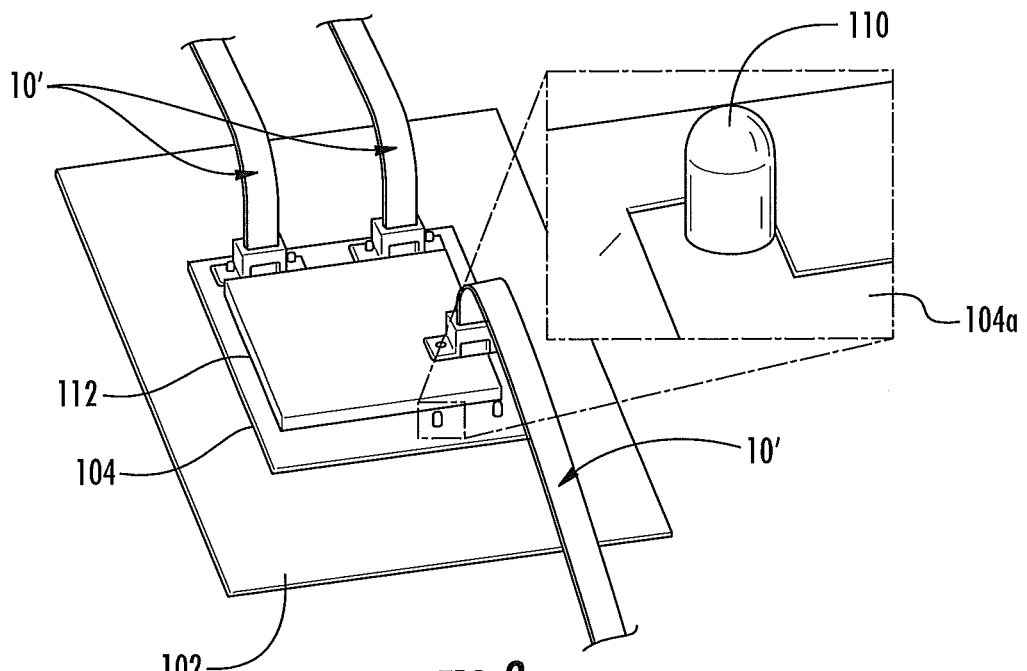
Figure 9:
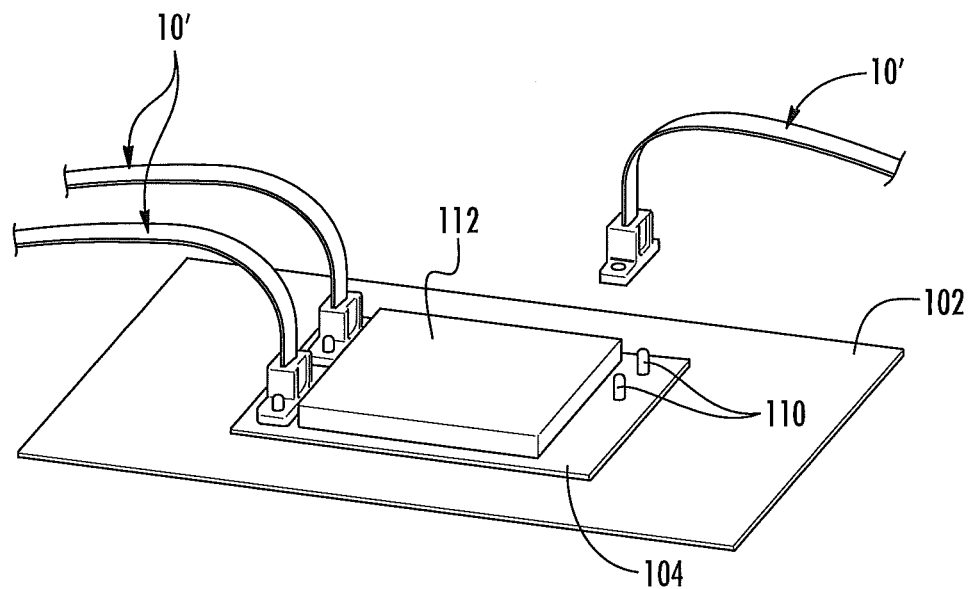
Figure 10:
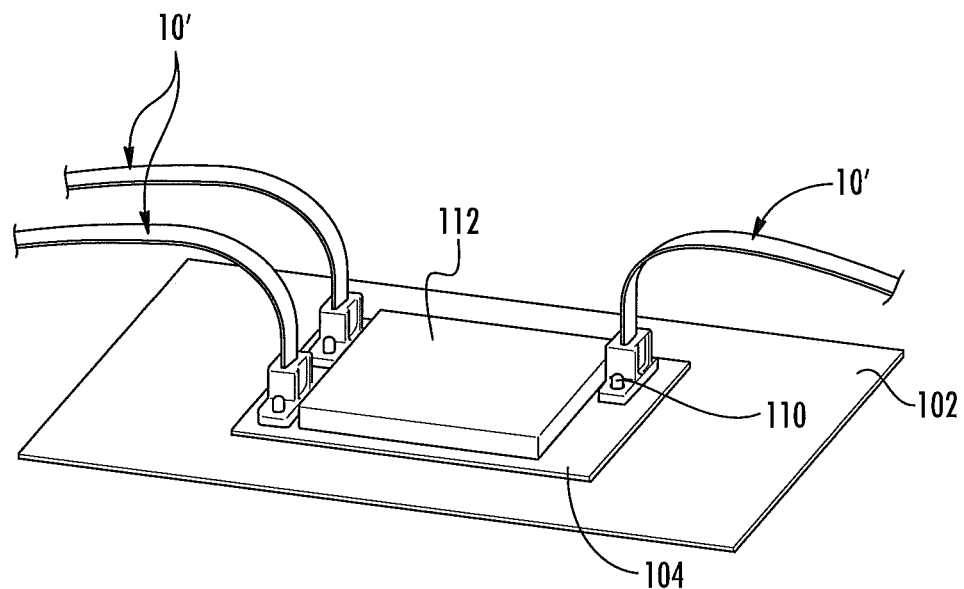

FIG. 8 depicts first and second pins 110 mounted to the desired locations of the connector mounting surface 104a. In this particular embodiment, first and second pins 110 are referenced to a corner location of the connector mounting surface 104a as shown for providing precise alignment relative to the optical pathways on the interposer 104. By way of example, first and second pins 110 are aligned to within 1 micron or less of the reference centerline location on the connector mounting surface. One passive alignment technique for maintain this precision alignment for the pins relative to the optical pathways of the interposer is to form precise pin recess locations for inserting the first and second pins 110 during the etch process that forms the interposer. Thus, the pin recess locations can be referenced and formed during the interposer forming process and controlled to the desired degree. Another way to precisely form and place the pins is to mechanically lap or polish corners onto the pins for precise placement into the corners of the connector mounting surface. FIG. 9 depicts the right side optical assembly 10' before being attached to interposer 104 and FIG. 10 depicts the optical assembly 10' after being attached to interposer 104. A frame or other suitable device may be used for securing one or more of the optical assemblies 10' to the interposer 104 by securing the frame or device to circuit board 102.

Figure 11:
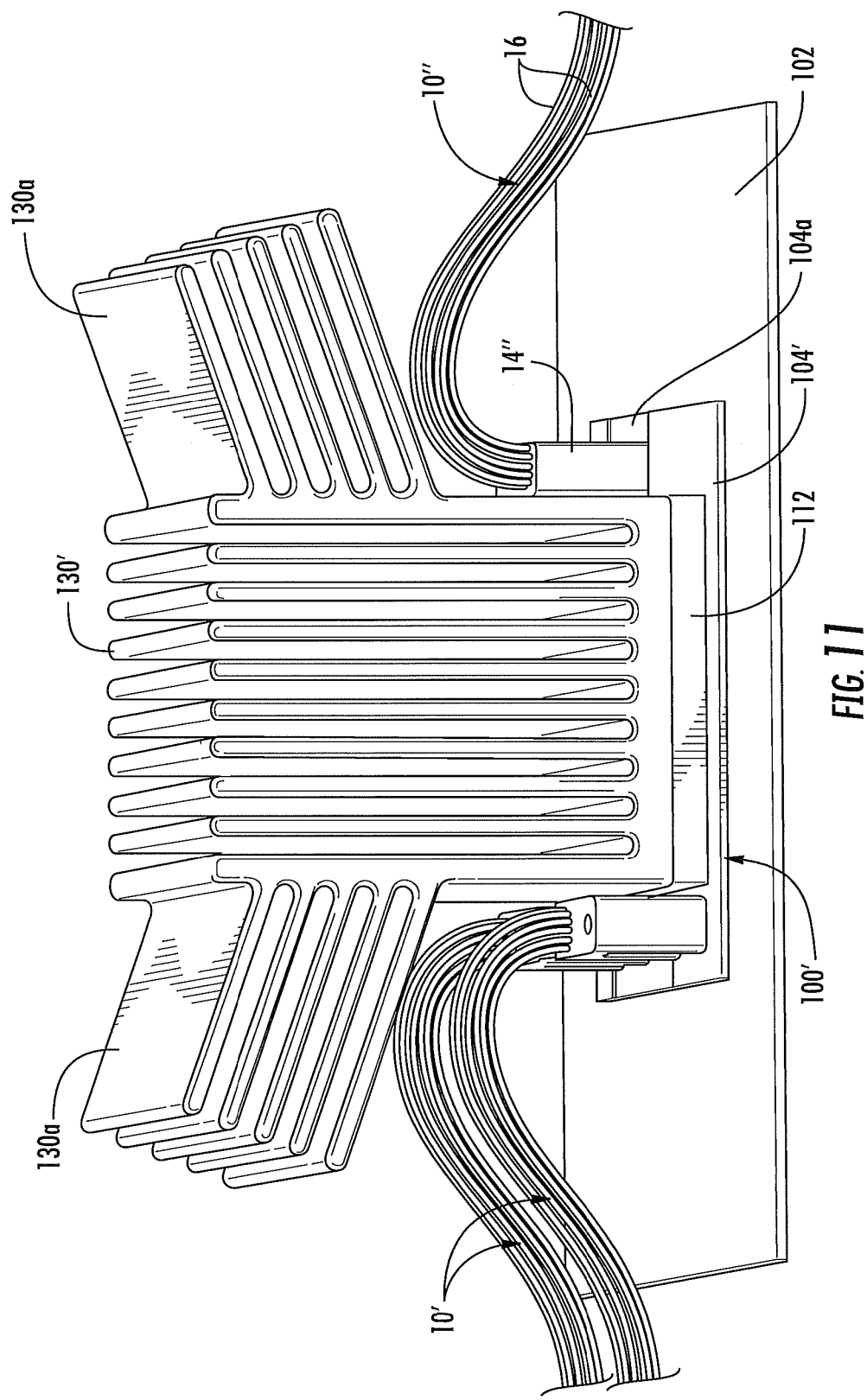
FIG. 11 is a perspective view showing another interposer structure along with another optical assembly according to the concepts disclosed herein.

FIG. 11 is a perspective view showing another interposer structure 100' similar to interposer structure 100 along with another optical assembly 10" attached to the interposer 100', which may use concepts disclosed herein. Interposer structure 100' includes a circuit board 102 and an interposer 104' with electrical connections therebetween for transmitting high-speed electrical signals. Interposer 104' having a connector mounting surface 104a that is matched for optical connection with optical assembly 10", which has a different non-linear footprint for the optical fiber openings of ferrule 14". The assembly also includes a heat sink 130' having one or more portions 130a that extend beyond the footprint of IC 112 for providing more surface area to improve cooling.

Figures 12, 13:
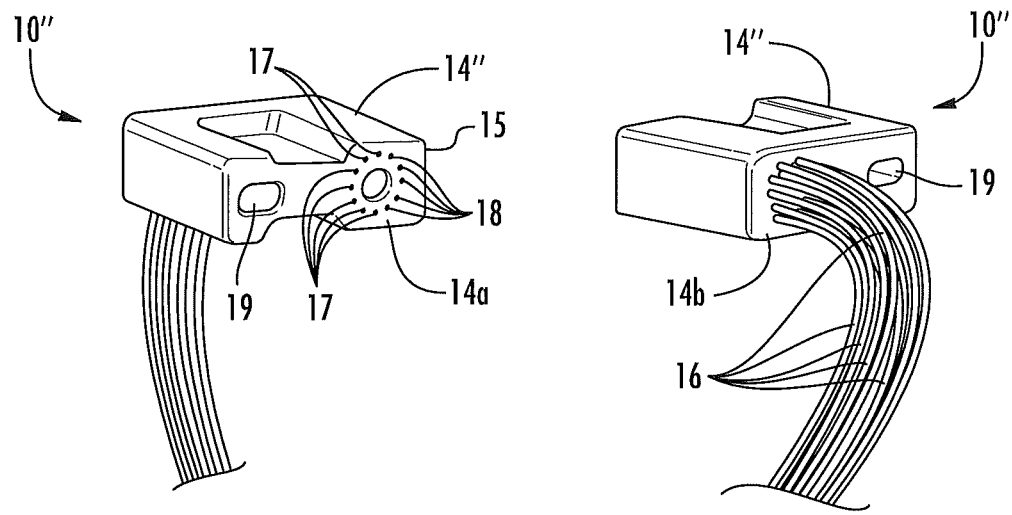
FIGS. 12 and 13 are respective front and rear perspective views of the optical assembly shown in FIG. 11.

FIGS. 12 and 13 are respective front and rear perspective views of the optical assembly 10", which is similar to optical assembly 10. Optical assembly 10" includes a ferrule 14" with a body and a plurality of optical fibers 16 attached to the ferrule 14". Like ferrule 14, ferrule 14" includes first alignment bore 15 having a round shape and second alignment bore 19 having a non-round shape. However, the first optical fiber openings 17 and the second fiber openings 18 of ferrule 14" are arranged in a different manner compared with ferrule 14.

FIG. 14 is a close-up view of the end face of the ferrule 14" of the optical assembly 10". As shown, the first plurality of optical fiber openings 17 are disposed on a first side of the first alignment bore 15 and the second plurality of optical fiber openings 18 are disposed on a second side of the first alignment bore 15. showing the optical assembly having the optical fibers arranged in a circular array about the first alignment bore. Using a circular array with a single ring of optical fiber openings that is concentric to the first alignment bore 15 positions the individual optical fiber openings in the ferrule all about the same distance from the centerline of the first alignment bore and may be beneficial for thermal performance for this reason. Other variations are also possible such as having more than one circular array disposed about the first alignment bore in a concentric manner to increase the number of optical connections.

Figure 15:
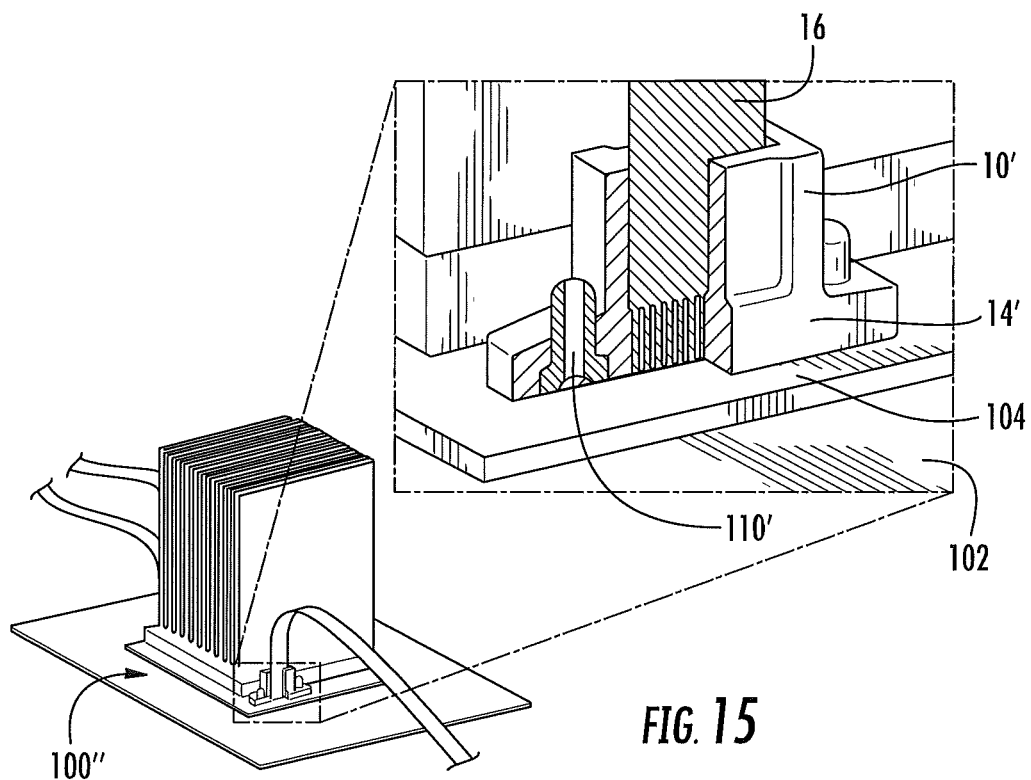
FIG. 15 is a perspective view along with a partial cutaway view showing another interposer structure along with the optical assembly of FIG. 7 according to the concepts disclosed herein.
Figure 16:
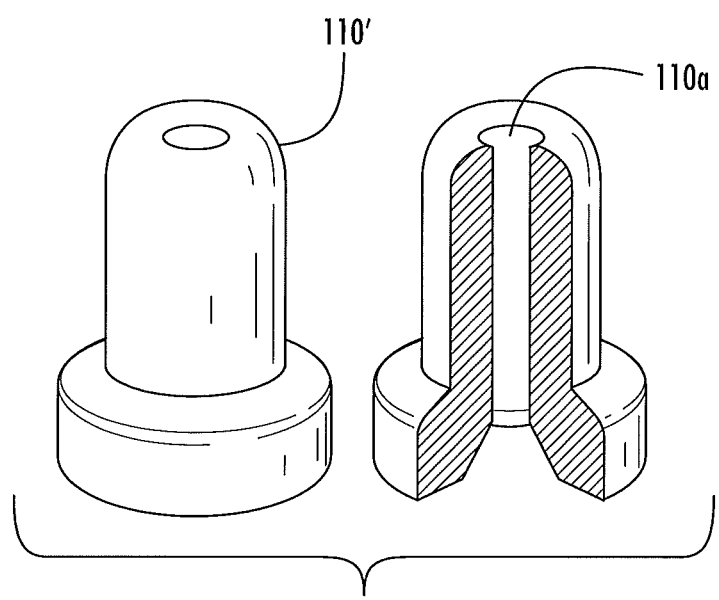
FIGS. 16-19 are various views of different alignment pins that may be used on the interposer according to the concepts disclosed.

FIG. 15 is a perspective view showing another interposer structure 100" similar to interposer structure 100 along with the optical assembly of 10' attached thereto. Interposer 104 includes a connector mounting surface where one end of the optical pathways (not visible) are exposed for optical connection with optical assembly 10' as discussed herein. In this embodiment, first and second alignment pins 110' are attached to the interposer 104. As best shown in FIG. 16, alignment pins 110' include a hollow portion 110a. Hollow portion 110a allows the pins to be attached using a UV curable adhesive and still allowing curing no matter the material used since UV radiation can enter the opening at the top of the hollow portion 110a for curing. Moreover, the hollow portion 110a allows a space for the adhesive to flow and bond the parts. In this embodiment, hollow portion 110a of pin 110' extends from the top of the pin to the bottom of the pin, but this may not be necessary. Pins 110' may be formed from any suitable material such as a polymer, metal or the like.

The use of pins on the interposer can allow various methods of making the interposer structure. For instance, the pins may be actively aligned to the interposer optical pathways using a ferrule or a jig for fixturing. By way of explanation, the pins are held in the bores of the ferrule or jig and the optical fibers of the ferrule or jig are actively aligned. Once the desired placement is located the pins can then be bonded to the interposer such as by curing a UV adhesive or the like. Further, the pins with hollow portions 110a can also application of the adhesive before or after active alignment of the ferrule or jig with the optical pathways on the interposer. For instance, the adhesive may be applied to the pins prior to placement on the interposer or the adhesive may be injected from the top of the hollow portion 110a into the pin 110 for minimizing the flow of excess adhesive about the pin. Then, the ferrule or jig may be removed from the interposer and pins as desired.

Figure 17:
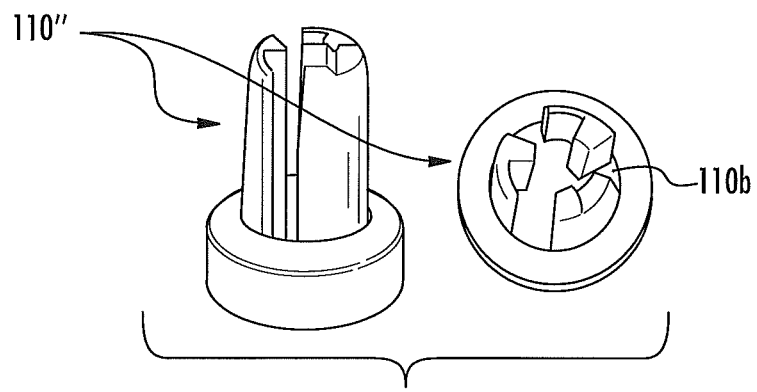
Figure 18:
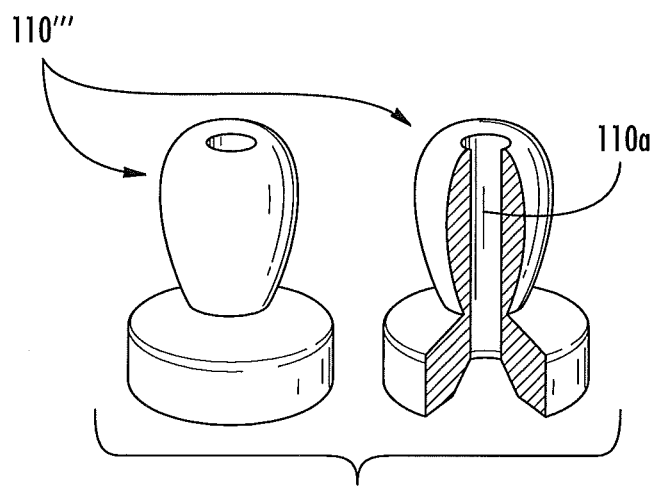
Figure 19:
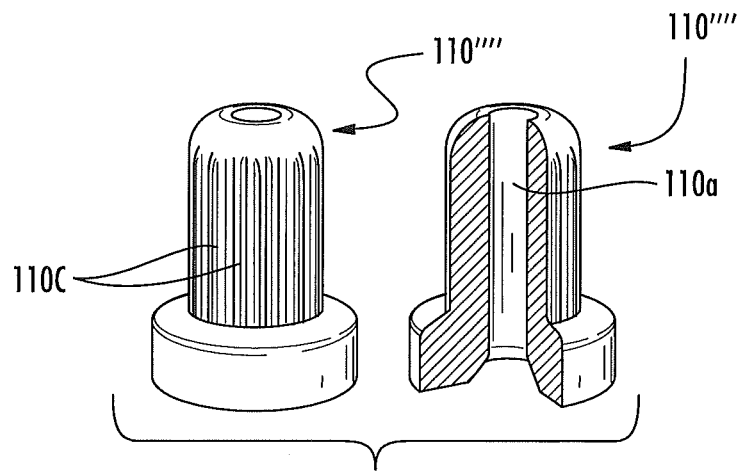

Of course, other variations of pins are possible according to the concepts disclosed. Illustratively, FIGS. 17-19 are various views of different alignment pins that may be used on the interposer according to the concepts disclosed. FIG. 17 shows a pin 110" having a castellated portion 110b. Castellated portion 110b allows the interposer structure and optical assembly to handle relative CTE mismatch by allowing the pins 110" to deform when under strain while still remaining "self-centering." Pins having castellated portions will need to be formed so they have a resilient character and so they can return close to original shapes/sizes. Other variations of pins may also have a resilient characteristic. For instance, FIG. 18 depicts pins 110''' having a hollow portion 110a that also provides a resilient characteristic by using a bulbous portion. Still other variations of pins are possible such as pin 110' shown in FIG. 19. In addition to having hollow portion 110a, pins 110' include a plurality of splines 110c that provide an interference fit with the alignment bores of the cooperating ferrule. Of course, it is possible that the hollow portions of the pins could be eliminated if the material used for the pins was formed from a UV transmissive material or a heat cured adhesive, solder, etc. was used.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A fiber optic connector ferrule having a body, comprising:
    a first alignment bore having a round shape;
    a second alignment bore, the second alignment bore being non-round;
    a first plurality of optical fiber openings being disposed on a first side of the first alignment bore; and
    a second plurality of optical fiber openings being disposed on a second side of the first alignment bore, wherein the first plurality of fiber openings and second plurality of optical fiber openings are arranged in a circular array about the first alignment bore.

2. The ferrule of claim 1, the first plurality of optical fiber openings being disposed between the first alignment bore and the second alignment bore.

3. The ferrule of claim 1, the second plurality of optical fiber openings being disposed between the first alignment bore and a periphery of the ferrule.

4. The ferrule of claim 1 being formed from a material including a filler.

5. The ferrule of claim 4, the filler being 40 percent or more of the material.

6. The ferrule of claim 1, further including a plurality of optical fibers attached to the ferrule to form an optical assembly.

7. The assembly of claim 6 being attached to an interposer structure.

8. The assembly of claim 7, wherein an interposer of the interposer structure is formed from a material with a first coefficient of thermal expansion (CTE) and the ferrule is formed from a material with a second CTE, and the CTE delta between the interposer and the ferrule is $1.0 \times 10^{-6}$° C. ($\Delta$mm/mm) or less at ambient conditions.

9. A fiber optic connector ferrule having a body, comprising:
    a first alignment bore having a round shape;
    a second alignment bore, the second alignment bore being non-round;
    a first plurality of optical fiber openings being disposed on a first side of the first alignment bore; and
    a second plurality of optical fiber openings being disposed on a second side of the first alignment bore, wherein the first plurality of fiber openings and second plurality of optical fiber openings are arranged in a circular array about the first alignment bore, wherein the body is formed from a material including one or more fillers.

10. The ferrule of claim 9, the first plurality of optical fiber openings being disposed between the first alignment bore and the second alignment bore.

11. The ferrule of claim 9, the second plurality of optical fiber openings being disposed between the first alignment bore and a periphery of the ferrule.

12. The ferrule of claim 9, the one or more fillers being 40 percent or more of the material by weight.

13. The ferrule of claim 1, further including a plurality of optical fibers attached to the ferrule to form an optical assembly.

* * * * *